United States Patent Office 3,733,291
Patented May 15, 1973

3,733,291
FORMATION PROCESS FOR PRODUCING DIELECTRIC ALUMINUM OXIDE FILMS
Robert S. Alwitt, Williamstown, Mass., assignor to Sprague Electric Company, North Adams, Mass.
No Drawing. Filed July 23, 1971, Ser. No. 165,580
Int. Cl. C23b 9/02
U.S. Cl. 204—29
7 Claims

ABSTRACT OF THE DISCLOSURE

A process for forming dielectric aluminum oxide films produces a foil system that will not lose capacitance in a working electrolyte for formations of 50 v. or more. An aluminum foil surface has a hydrous oxide formed thereon, and a barrier oxide layer anodically formed through this hydrous film. Any excess hydrous oxide remaining is stripped away with a solution made up of $H_3PO_4$ and $CrO_3$; and on this surface the barrier oxide layer is anodically reformed in the same manner as in the original formation. Such a formation process can be used to produce a unit having a much lower equivalent series resistance than prior art units.

BACKGROUND OF THE INVENTION

This invention relates to a formation process for producing dielectric aluminum oxide films, and more particularly to a formation process that includes preboil, formation, stripping, and reformation steps for producing highly efficient dielectric aluminum oxide films, and which can be used for intermediate and high voltage application.

It is well known to the aluminum foil capacitor art, that the utilization of a preboil in the formation process produces a more efficient formation, as it needs less electrical energy to yield good formation properties. This is true for both the intermediate and high voltage formation processes. However, such use of a preboil is also accompanied by certain problems and undesirable characteristics. For example, where a preboil is used at formation voltage of up to 200 v., excess pseudoboehmite (hydrous aluminum oxide) is produced on the foil that is not fully consumed during the subsequent formation of the barrier oxide layer. This causes a sharp decrease in the capacitance and an increase in equivalent series resistance (ESR)—very undesirable properties.

High voltage (over 200 v.) formation processes have also utilized a preboil to enhance the formation properties. Etched foils are used in this voltage range, and the thickness of the oxide grown thereon is almost as great as the thickness of the etched pores, causing the pores to get "plugged up." The hydrous oxide film formed during the preboil is the largest single contributor to this problem.

In order to make high capacitance photoflash capacitors, it may be advantageous to use a dual anode construction. To do this successfully requires a foil that retains porosity after formation, so as to allow for the relatively uninhibited passage of an electrolyte through the dual anode construction. However, this passageway becomes fairly well plugged with hydrous aluminum oxide thereby inhibiting the passage of electrolyte through the system and increasing the ESR to an undesirable level. New intermediate and high voltage formation processes are constantly being sought in the capacitor field.

Accordingly, it is an object of the present invention to provide a formation process for aluminum foil that utilizes a preboil and eliminates the usually accompanying capacitance loss that occurs with foil formed at 220 v. or below, and also produces a much lower foil ESR.

It is another object of this invention to successfully eliminate any excess hydrous oxide not converted to the barrier oxide during the formation process, while maintaining the advantageous formation properties that accompany the use of a preboil in the formation process.

It is a further object of the present invention to produce a foil that retains porosity after formation, so as to allow for the uninhibited flow of electrolyte therethrough.

SUMMARY OF THE INVENTION

Aluminum foil is treated in boiling water so as to produce a hydrous oxide film thereon. A barrier oxide layer is then anodically formed on the aluminum foil in an electrolyte. Some hydrous oxide remains upon the completion of the anodic formation that is not converted to the completion of the anodic formation that is not converted to the barrier oxide during this process. This excess hydrous oxide is then stripped away in a

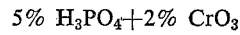

5% $H_3PO_4$+2% $CrO_3$ solution, so as to eliminate the source of prior art difficulties. The barrier oxide layer is anodically reformed in an electrolyte producing porous, stable and efficient foils for high capacitance units. Because the excess hydrous oxide has been removed from the foil, there is no sharp decrease in capacitance when these foils are used in capacitors, and likewise a lower ESR is produced therein. The subsequent reformation step heals any flaws or defects brought about by the stripping process.

DESCRIPTION OF THE PREFERRED EMBODIMENTS

In a preferred embodiment of the present invention, a hydrous aluminum oxide film is formed on aluminum foil after being treated in boiling hot water. The treated foil is then placed in a non-borate electrolyte, such as ammonium dihydrogen phosphate, so as to anodically form a barrier oxide layer thereon. When this layer is formed, some of the hydrous oxide film is converted to the barrier oxide during the formation and some excess or residual hydrous oxide remains thereon. This excess hydrous oxide causes many problems in capacitor units where these foils are used. Accordingly, the excess hydrous oxide is stripped away by dissolving it in a $H_3PO_4$—$CrO_3$ solution. This solution is advantageous because it dissolves the hydrous oxide well, but will not corrode the aluminum. At this point, the barrier oxide layer is reformed in the non-borate electrolyte, so as to cure any defects caused during the stripping process.

A satisfactory 200–220 v. formation can be obtained with the following sequence: a four minute boil in water, two minute anodic formation in a 1 gram/liter ammonium dihydrogen phosphate solution at 90° C., followed by a stripping step to remove any residual hydrous oxide that includes exposing the foil two minutes to a 5% $H_3PO_4$+2% $CrO_3$ stripping solution at 85° C., and finally reforming the barrier oxide layer for one minute in the 1 gram/liter ammonium dihydrogen phosphate at 90° C. Etched foil formed in this manner had only a 3% capacitance loss compared with reported values of up to 15% for foil formed by prior art methods. The equivalent series resistance (ESR) for the foils produced as described herein was approximately one-half of the ESR of prior art foils.

At formation voltages of over 220 v., where a borate electrolyte such as boric acid is used, the quality of the dielectric film can be impaired when the foil is exposed to the $H_3PO_4$+$CrO_3$ solution. Although $H_3PO_4$ alone was found to be a satisfactory stripping agent, it cannot be used alone for extended periods because of excessive corrosion of the structural members of the formation machinery used therein. It is more advantageous, therefore, to use trace amounts of $CrO_3$ in order to curtail corrosion within the system, while keeping the impairment of the quality of the dielectric film to a minimum. Alternatively, stainless steel formation machinery can be used, as this will not corrode.

The hydrous aluminum oxide is formed by treating the aluminum foil for a short time in hot water. It is much simpler, however, to bring the water to boiling, as this eliminates cumbersome and time consuming temperature measurements. Also, an attempt should be made to keep the length of time necessary to expose the foil to the boiling water to a minimum, as too thick a hydrous oxide film will require much longer exposure to the stripping solution, which may possibly cause some attack of the barrier oxide by the stripping solution, depending on the formation electrolyte used therein.

The formation process used herein should preferably be in a non-borate electrolyte, since the stripping solution will more readily attack the barrier oxide layer formed in a borate electrolyte. Typical examples of such non-borate electrolytes includes a 1 gram/liter ammonium dihydrogen phosphate solution (up to 220 v. formations), and 0.01 N sodium benzoate (pH 6) solution (up to 350 v.). During this process, some of the hydrous oxide film is converted into the barrier film, but much of the hydrous film remains behind as excess causing the sharp decrease in the capacitance of the units utilizing such foils.

The selective stripping of this residual hydrous oxide is preferably accomplished by exposure to the $H_3PO_4+CrO_3$ solution. The stripping reduces the capacitance decrease for films formed in the lower voltage ranges in both borate and non-borate electrolytes. A fifteen minute strip at 60° C. essentially eliminated the capacitance decrease with the non-borate foils formed at 150 v., and very little attack of barrier oxide occurred during the stripping herein. It was also found that a solution of 5% $H_3PO_4+2\%$ $CrO_3$ was sufficient to strip foiled formed at 200 v., when used for approximately two minutes at 85° C. The temperature can vary by at least ±3° C. and the time by ±15 seconds without affecting the foil quality or formaation process. One skilled in the art can effectively choose the time and temperature combination most suitable for him, but once these parameters are chosen they should be adhered to rather closely.

I should also be noted that although $H_3PO_4$ and $H_3PO_4+CrO_3$ solutions have been mentioned as being the preferred stripping solutions, any solution that will attack the hydrous oxide film at a faster rate than it will attack the barrier oxide layer can advantageously be used for stripping purposes within the scope of this invention.

Formation electrolytes that can be used include 0.01 N sodium benzoate (pH~6) and 1 gram/liter ammonium dihydrogen phosphate, however, other electrolytes known to one skilled in the art could be used as well. The benzoate electrolyte is good to 350 v. The ammonium dihydrogen phosphate solution can be used to only 220 v., and requires no special maintenance. Up to 220 v., the dielectric properties of the films formed in each of these electrolytes are the same.

These same electrolytes and other conditions can be used in the reformation process as in the original formation, however, the amount of time required to reform this barrier oxide layer is considerably less than in the original formation step. All that is necessary in the reformation step is to cure or heal any defects or flaws in the barrier oxide layer caused by the stripping process.

Since it is obvious that changes and modifications can be made in the above-described details without departing from the nature and spirit of the invention, it is to be understood that the invention is not limited to said details except as set forth in the appended claims.

What is claimed is:

1. A process for forming dielectric aluminum oxide film comprising:
   (a) treating aluminum foil in hot water so as to form a hydrous oxide film thereon;
   (b) anodically forming a barrier oxide layer on said foil so as to convert some of said hydrous oxide film to the barrier oxide and leave some excess hydrous oxide film;
   (c) exposing said foil to a stripping solution that attacks said hydrous oxide film at a faster rate than it attacks said barrier oxide layer so as to remove said exceess hydrous oxide film remaining thereon; an exceess hydrous oxide film remaining thereon; and
   (d) anodically reforming said barrier oxide layer after exposure to said stripping solution.

2. The process of claim 1 wherein said hydrous oxide film is formed in boiling hot water; said anodic formation takes place in a non-borate electrolyte.

3. The process of claim 2 wherein said non-borate electrolyte is at least one electrolyte selected from the group consisting of ammonium dihydrogen phosphate and sodium benzoate; and said stripping solution consists of a mixture of $H_3PO_4$ and $CdO_3$.

4. The process of claim 3 wherein said stripping solution is 5% $H_3PO_4+2\%$ $CrO_3$, and said non-borate electrolyte is a solution of 1 gram/liter ammonium dihydrogen phosphate.

5. The process of claim 4 wherein said foil is treated in the hot water for four minutes; said anodic formation takes place for two minutes in said electrolyte at 90° C.; said foil is exposed to said stripping solution for two minutes at 85° C.; and said anodic reformation takes place for one minute in said electrolyte at 90° C.

6. The process of claim 3 wherein said stripping solution is 5% $H_3PO_4+2\%$ $CrO_3$, and said non-borate electrolyte is a solution of 0.01 N sodium benzoate.

7. The process of claim 1 wherein said hydrous oxide film is formed in boiling hot water; said anodic formation takes place in a borate electrolyte.

References Cited

UNITED STATES PATENTS

| 2,859,148 | 11/1958 | Altenpohl | 204—38 A |
| 2,981,647 | 4/1961 | Schwartz | 148—6.27 |
| 2,868,702 | 1/1959 | Brennan | 204—58 |

FOREIGN PATENTS

| 1,179,486 | 1/1970 | Great Britain | 204—58 |

GERALD L. KAPLAN, Primary Examiner

U.S. Cl. X.R.

204—35 N, 58